(12) United States Patent
Palazzola et al.

(10) Patent No.: US 12,415,706 B2
(45) Date of Patent: Sep. 16, 2025

(54) ELECTRICAL MONITORING CONNECTOR FOR AN ELEVATOR HOISTING MEMBER

(71) Applicant: TK Elevator Innovation and Operations GmbH, Duesseldorf (DE)

(72) Inventors: Michael Palazzola, Horn Lake, MS (US); Jordan Strother, Marietta, GA (US)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 1182 days.

(21) Appl. No.: 17/248,600

(22) Filed: Jan. 29, 2021

(65) Prior Publication Data

US 2022/0242697 A1 Aug. 4, 2022

(51) Int. Cl.
*B66B 7/12* (2006.01)
*B66B 7/06* (2006.01)
*G01N 27/20* (2006.01)

(52) U.S. Cl.
CPC ............ *B66B 7/1223* (2013.01); *B66B 7/062* (2013.01); *G01N 27/20* (2013.01)

(58) Field of Classification Search
CPC ........ B66B 7/1223; B66B 7/062; G01N 27/20
See application file for complete search history.

(56) References Cited

U.S. PATENT DOCUMENTS 8,640,828 B2 * 2/2014 Annen ................. H01R 12/592
340/677
10,029,888 B2 * 7/2018 Lehtinen .............. H01R 13/207
12,091,287 B1 * 9/2024 Martins ................... B66B 7/062
12,234,126 B2 * 2/2025 Wang ..................... B66B 7/1223
12,286,330 B2 * 4/2025 Martins ................... B66B 7/1223
2011/0220438 A1 * 9/2011 Annen .................... B66B 7/062
439/884

(Continued)

FOREIGN PATENT DOCUMENTS

EP      3028979 A1    6/2016
EP      3053867 A1    8/2016

OTHER PUBLICATIONS

International Search Report, dated Jan. 31, 2022, in parent International Application No. PCT/EP2021/080800.

*Primary Examiner* — Ryan J. Walters
(74) *Attorney, Agent, or Firm* — Dinsmore & Shohl LLP

(57) ABSTRACT

An electrical monitoring connector for electrically monitoring the health of electrically conductive tension members in an elevator hoisting member includes a housing for insertion therein of a terminal end of an elevator hoisting member, and an elastomeric connector block inside the housing having a plurality of alternating electrically conductive and non-conductive layers. The connector block is slidable within the housing, and configured to be both electrically connected to active health monitoring equipment and biased by a spring against exposed cut ends of the plurality of electrically conductive tension members, when the terminal end of the elevator hoisting member is inserted in the housing, so as to make electrical connections between the exposed ends of the tension members and only those of the electrically conductive layers that are aligned and make contact therewith, to permit monitoring signals from the health monitoring equipment to be sent down the tension members.

17 Claims, 7 Drawing Sheets

(56) References Cited

U.S. PATENT DOCUMENTS

| | | | |
|---|---|---|---|
| 2016/0152445 A1* | 6/2016 | Lehtinen | H01R 13/639 439/367 |
| 2016/0221796 A1* | 8/2016 | Puranen | B66B 7/085 |
| 2023/0271808 A1* | 8/2023 | Evert | B66B 7/1215 187/264 |

* cited by examiner

ELECTRICAL MONITORING CONNECTOR FOR AN ELEVATOR HOISTING MEMBER

FIELD

This disclosure relates to traction elevator hoisting belts and belt monitoring connectors for traction elevator hoisting belts used to monitor the health of elevator hoisting belts.

BACKGROUND

Traction elevators have evolved in recent years. Older traction elevators typically had used thick steel wire ropes as the hoisting/suspension member(s) to raise and lower an elevator cab in an elevator shaft. However, the most recent generations of traction elevators, instead of using thick steel wire ropes, now often use one or more relatively thin traction belts as the hoisting/suspension member(s). These traction belts are typically made of a plurality of thin or small diameter tension members, such as steel cords, that are laid parallel to each other, spaced apart side-by-side in a single row, and are fully embedded along their length within a polymer outer jacket. Because the tension members of the hoisting belt are fully embedded/encapsulated within the polymer outer jacket, except at the terminal ends of the belt, they cannot be visually inspected along their length for signs of wear, as could a predecessor thick wire rope hoisting member. In the case where the embedded tension members are steel cords, those signs of wear can include abrasion of individual wires that make up the cord, corrosion, fatigue cracking, and other potentially serious issues that could affect their structural integrity as tension/suspension members and lead to failure of the hoisting belt. Accordingly, many jurisdictions require end-to-end monitoring of the tension/suspension members, or cords, within traction elevator hoisting belts.

For belts that incorporate cords made of electrically conductive materials, such as steel cords made from a plurality of individual steel wires twisted together in various configurations, it is now fairly common to use electrical signals sent from one terminal end of the cords to the opposite terminal end of the cords, to monitor the "health" of one or more of the individual cords. The "health" being monitored via electrical signals can include, among other characteristics, the residual tensile strength remaining in the cords, the degree of corrosion present in each cord, identification of individual broken cords, etc. Accordingly, with the health of the cords being monitored by electrical signals being sent down one end of a cord and received at another end of the cord, there is a need to ensure a secure electrical contact between the cords and the electrical signal monitoring equipment that monitors the health of the cords embedded within the belt.

SUMMARY

Described herein is an electrical monitoring connector for use with an elevator hoisting member, for electrically monitoring the health of the elevator hoisting member.

According to the present invention herein disclosed, the electrical monitoring connector includes a housing configured to permit the insertion therein of a terminal end of an elevator hoisting member, at which terminal end are located exposed cut ends of a plurality of electrically conductive tension members embedded in an outer jacket. The monitoring connector further includes an elastomeric connector block within the housing, which connector block is slidably movable within the housing along an axis of insertion that is defined by the insertion direction of the elevator hoisting member. The elastomeric connector block has a plurality of alternating electrically conductive and non-conductive layers, in which the conductive layers are configured to be electrically connected to electrical health monitoring equipment.

In one aspect of the present disclosure, the elastomeric connector block can be installed on (or adjacent to) a printed circuit board ("PCB") such that the PCB is physically and electrically affixed to the conductive layers in the elastomeric connector block, for example by a plurality of solder joints. Each solder joint physically and electrically connects several adjacent electrically conductive layers, as a group, to each of a different one of a plurality of electrical traces in/on the PCB. In this manner, the PCB is slidably movable within the housing together with the elastomeric connector block.

In another aspect of the present disclosure, such an intermediary PCB may be connected to the electrical health monitoring equipment, for example by individual wires of a signal cable that have their proximal ends soldered to the circuit board and their distal ends configured to be connected to the electrical health monitoring equipment.

In yet another aspect of the present disclosure, the electrical monitoring connector also includes at least one biasing means, such as a spring or set screw, that is disposed within the housing and is configured to bias the elastomeric connector block against the exposed cut ends of the plurality of electrically conductive tension members in the elevator hoisting member, when the terminal end of the elevator hoisting member is inserted in the housing to a termination depth. In this manner, a series of secure electrical connections between the exposed cut ends of the tension members and only those of the plurality of electrically conductive layers that are aligned and make contact with the ends of the tension members. This biasing that ensures the cut ends of the tension members remain in electrical contact with the elastomeric connector block permits the health monitoring equipment to constantly send the electrical health monitoring signals through the circuit board, the elastomeric connector block, and down through the plurality of electrically conductive tension members.

In another aspect of the present disclosure, the housing includes a plurality of teeth embedded in, and protruding from, at least one inner wall of the housing. The teeth are configured to engage the outer jacket of the elevator hoisting member when the elevator hoisting member is inserted into the housing. The teeth permit the elevator hoisting member to be inserted into the housing of the electrical monitoring connector in one direction (i.e. an insertion direction). By contrast, the teeth will dig into the outer jacket of the elevator hoisting member when the elevator hoisting member is pushed or pulled in the direction opposite that of the insertion direction (i.e. a withdrawal direction). The teeth digging into the jacket of the elevator hoisting member prevents the elevator hoisting member from being withdrawn from the housing in order to help maintain the electrical connection between the elastomeric connector block and the exposed cut ends of the tension members, even as the biasing means forces the elastomeric connector block to push on the cut ends of the tension members in the withdrawal direction.

In yet another aspect of the present disclosure, the housing may comprise a base and a cover removably affixed thereto. One or more of the housing, the base, or the cover may be made of a transparent material to permit the viewing therein of the position of the terminal end of the elevator hoisting member installed in the housing, the position and or condition of the internal components, the interaction and interfaces therebetween, and any installation errors that might be affecting electrical connectivity between the terminal end of the elevator hoisting member and the elastomeric connector block within the housing.

BRIEF DESCRIPTION OF THE DRAWINGS

The present invention is described in detail below with reference to the attached drawing figures, wherein:

FIG. 2A is a front plan view of an exemplary embodiment of a terminal end of an elevator hoisting member of the present disclosure, in the form of a belt, showing the exposed cut ends of the electrically conductive tension members, in the form of cords, embedded in the outer jacket of the belt;

FIG. 2B is a plan view of the elevator hoisting member of FIG. 2A, showing the exposed cut ends of the tension members protruding slightly therefrom.

DETAILED DESCRIPTION

Figure 1:
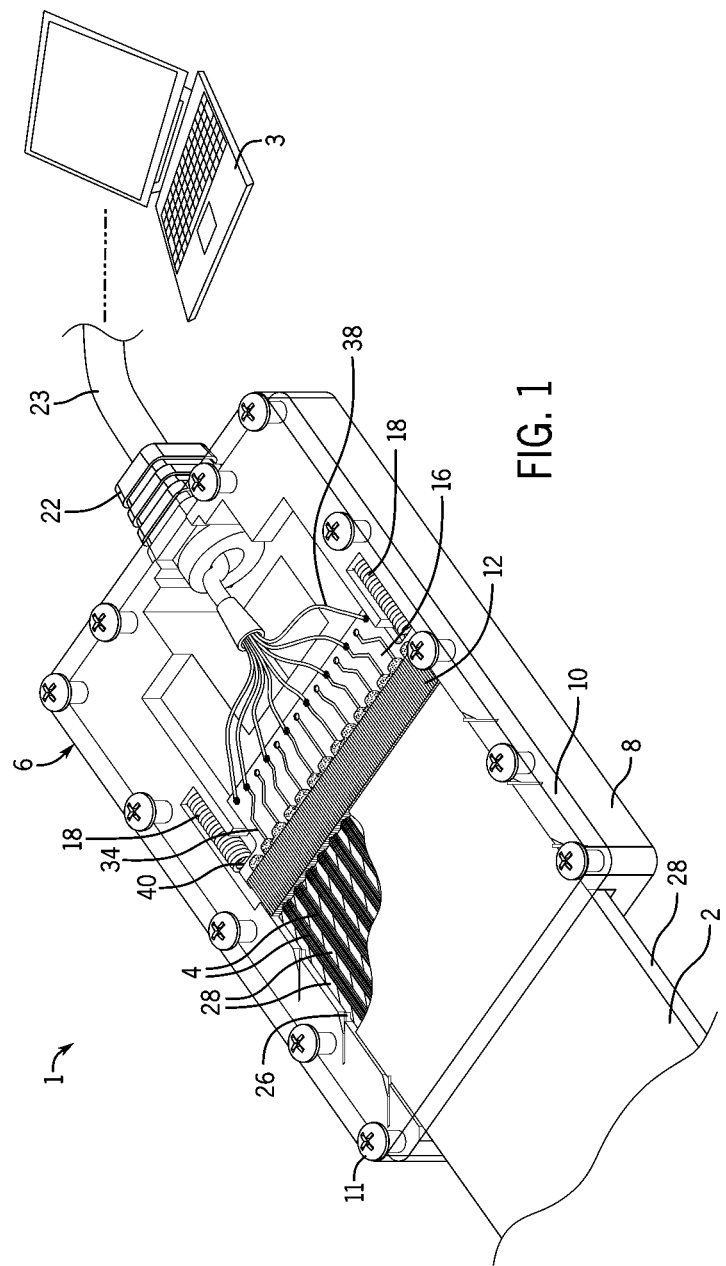
FIG. 1 is a perspective view of an embodiment of an electrical monitoring connector of the present disclosure, for use with an elevator hoisting member in the form of a belt, in which the monitoring connector is electrically connected to monitoring equipment for electrically monitoring the health of the electrically conductive tension members within the belt, and showing a partial cutaway view of a terminal end of an exemplary elevator hoisting belt on which the monitoring connector is to be installed.

While the present disclosure is capable of embodiment in various forms, there is shown in the drawings, and will be hereinafter described, one or more presently preferred embodiments with the understanding that the present disclosure is to be considered as an exemplification of the invention, and is not intended to limit the invention to the specific embodiments illustrated. The headings used throughout this disclosure are provided for convenience only and are not to be construed to limit the claims in any way. The various embodiments disclosed herein may be combined with other embodiments for the creation and description of yet additional embodiments. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims.

Figure 2:
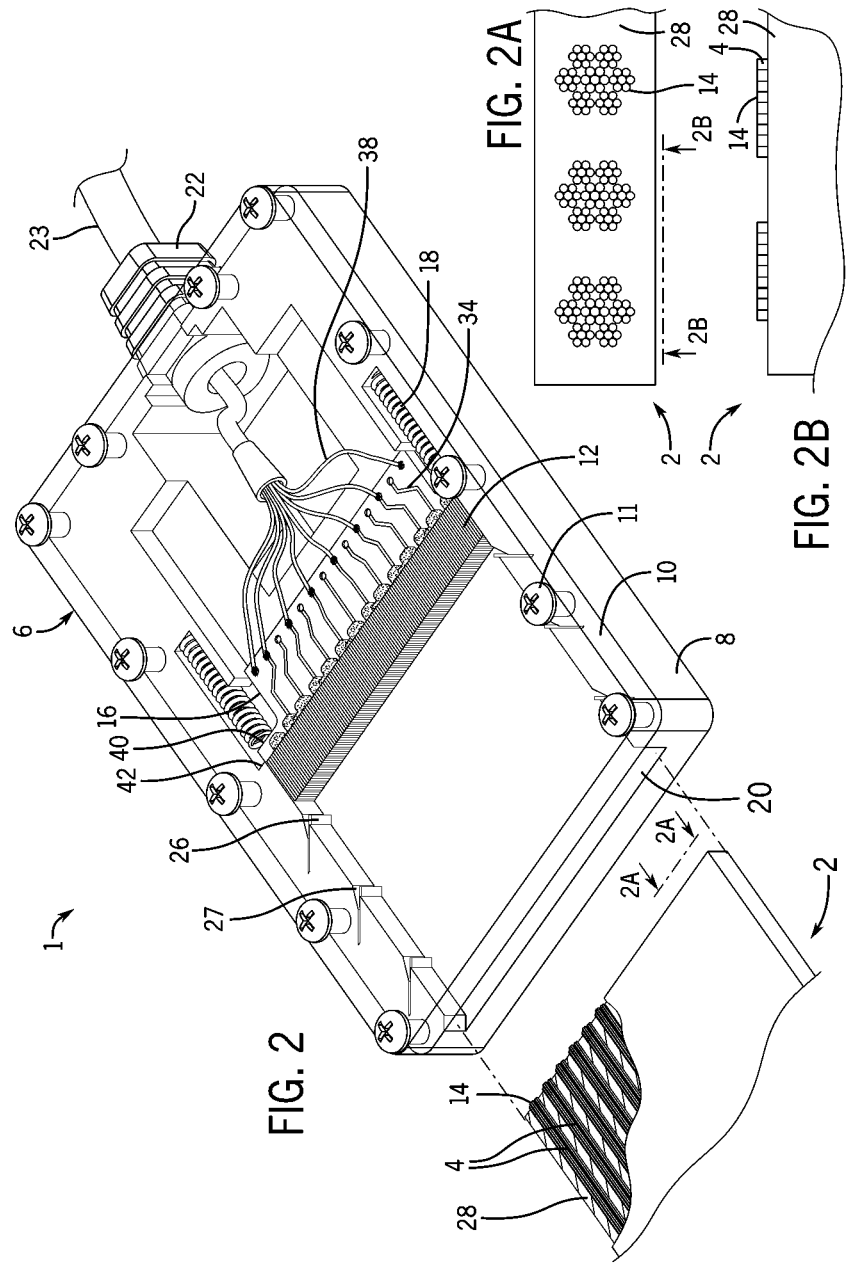
FIG. 2 is a perspective view of the monitoring connector of FIG. 1 prior to installation on a cut terminal end of the elevator hoisting member in the form of a belt, showing an initial position of the elastomeric connector block and PCB prior to installation on the end of the belt.

Referring to FIGS. 1-2, disclosed is an electrical monitoring connector 1 for use with an elevator hoisting member 2, which monitoring connector 2 is configured to permit the electrical monitoring of electrically conductive tension members 4 embedded within the elevator hoisting member 2. In one embodiment, the elevator hoisting member 2 is in the form of a belt, such that the hoisting member monitoring connector 1 is a belt monitoring connector. However, in alternate embodiments, the hoisting member 2 can have alternate shapes and configurations besides being that of a belt, such as a rope, without departing from the scope of the present disclosure. Accordingly, the terms "hoisting member," "belt" and "rope" can be used interchangeably for purposes of this disclosure, without departing form the scope of the present disclosure. Similarly, the terms "hoisting member monitoring connector," "electrical monitoring connector," "monitoring connector," and/or "belt monitoring connector" can also be used interchangeably for purposes of this disclosure, without departing form the scope of the present disclosure.

The electrical monitoring connector, or belt monitoring connector 1, is configured to make a secure electrical connection between the exposed cut ends 14 of electrically conductive tension members, such as cords 4 made from electrically conductive materials like steel or carbon fiber, that are embedded within an elevator hoisting member, such as a traction elevator hoisting belt 2, and the health monitoring equipment 3 used to actively monitor the health of the cords 4 in the belt 2. More specifically, the belt monitoring connector 1 is configured to establish a secure electrical connection between cut ends 14 of the cords 4 that protrude slightly from/through an outer jacket of the belt 2 at one of the belt's terminal ends, or terminal cut ends, and the health monitoring equipment 3 that sends and/or receives electrical signals through both the connector 1 and the belt 2 to actively monitor the health thereof. This secure electrical connection is established by sliding a terminal or cut end of the belt into the connector 1, to cause the exposed cut ends 14 of the cords 4 to contact an elastomeric connector block 12 disposed within the housing 6. The structural details of the belt monitoring connector 1 and the operation thereof will be discussed in further detail below.

Referring to FIG. 2, in one embodiment, the belt monitoring connector 1 includes a housing 6, comprising a housing base 8 and a housing cover 10 secured to the housing base 8. Disposed within the housing 6 is an elastomeric connector block 12 for making secure electrical contact with the exposed cut ends 14 of the cords 4 embedded within the hoisting belt 2, a circuit board 16 that is affixed and electrically coupled to the elastomeric connector block 12, and at least one spring 18 configured to bias the circuit board 16 and elastomeric connector block 12 towards a belt insertion pocket 20 of the housing 6. The belt monitoring connector 1 may further include a signal cable 23 having a plurality of wires 38 with proximal ends disposed within the housing 6 that are electrically connected to the circuit board 16 and opposing distal ends configured to be connected to the health monitoring equipment 3, and a strain relief 22 through which the signal cable 23 enters the housing 6.

Figure 3:
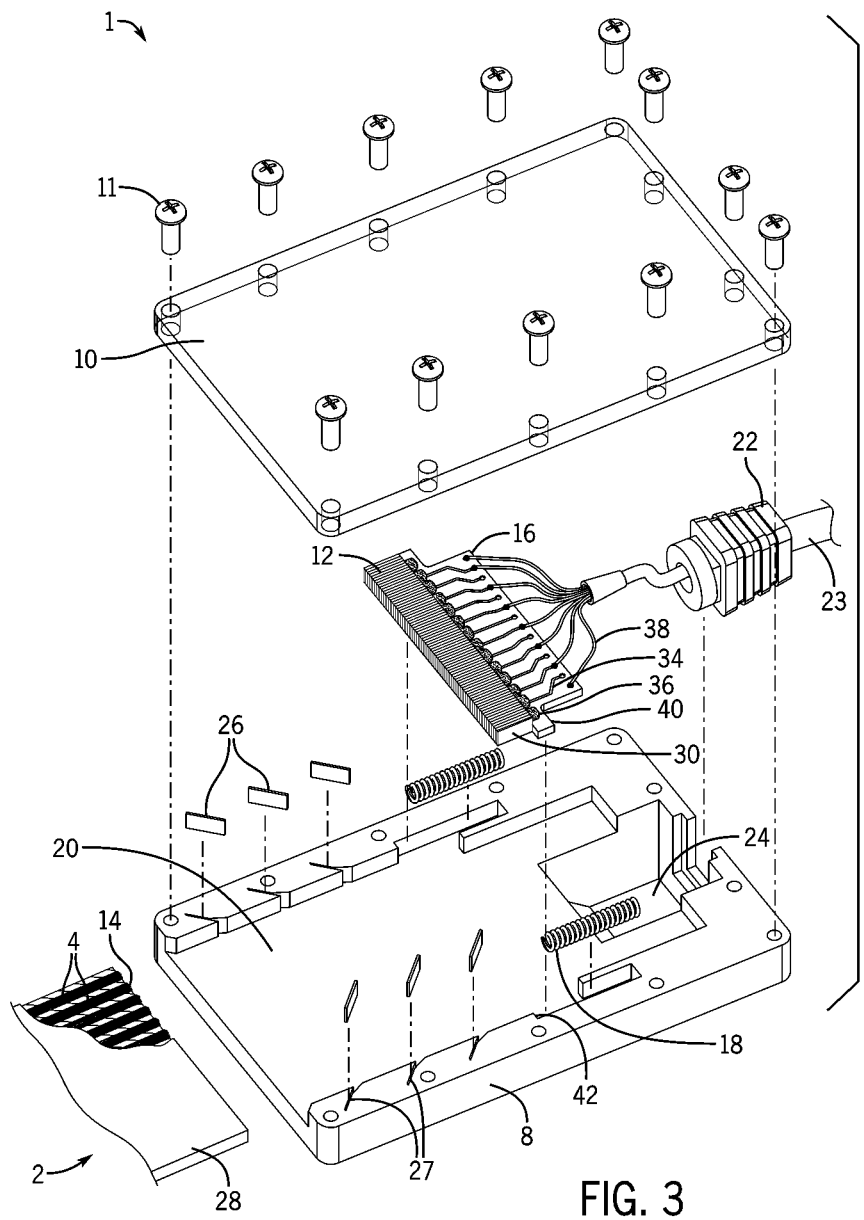
FIG. 3 is an exploded perspective view of the monitoring connector of FIG. 2.

Referring to FIGS. 2 and 3, in one embodiment, the housing 6 is substantially rectangular shaped and is constructed of a non-conductive material, such as a plastic or polymer based material. In alternative embodiments, the housing 6 may have alternate shapes or be made of other suitable materials without departing from the scope of the present disclosure. Referring to FIG. 3, the housing 6 defines a hollow central portion that includes a belt insertion pocket 20 in a front side of the housing 6, a monitoring cable clearance pocket 24 in a back side of the housing 6, and additional internal recesses, slots, holes or apertures defined therein that together define a through passage from an open end front of the belt insertion pocket 20 to an open back end of the monitoring cable clearance pocket 24. The two pockets 20, 24 can be defined at opposite ends, sides, or regions of the housing 6, or can alternately be positioned at locations on/in the housing 6 as best suits the particular configuration of the elevator and/or configuration of the terminal end of the hoisting member or belt 2, without departing from the scope of the present disclosure. For example, if the situation is warranted, the monitoring cable clearance pocket 24 can be configured such that the monitoring signal cable 23 enters the housing 6 through one of a side, top, or bottom surface of the housing 6, instead of through the back end, side, region, or surface, of the housing 6, as is otherwise depicted in the drawing figures.

In one embodiment, the housing 6 includes a housing base 8 and a housing cover 10. Referring to FIG. 3, the housing base 8 includes a number of recesses and/or slots defined therein configured to accommodate one or more of the springs 18, the circuit board 16, the elastomeric connector block 12, the strain relief 22, and the wires 38 from the monitoring signal cable 23 that is to be connected to the active monitoring equipment, all within the housing 6. In such an embodiment, the housing cover 10 can be merely a flat cover that primarily serves to close up the housing 6 and sandwich the components of the belt monitoring connector 1 securely inside. However, in alternate embodiments, both the housing base 8 and housing cover 10 can each contain various recesses, pockets, slots, or apertures to accommodate one or more of the aforementioned components contained therein. The housing cover 10 can be secured to the housing base 8 by a plurality of fasteners 11, such as screws, rivets, latches or other similar known removable and/or permanent fastener types, for example. Alternatively, the housing cover 10 and housing base 8 can be secured to each other by use of adhesives, epoxies, sonic welding, snap fit latches and other snap joinery techniques, and other similar joining structures and methods without departing from the scope of the present disclosure. In a preferred embodiment, one or more of the housing 6, the housing base 8, or the housing cover 10 is made from a transparent material through which an installer or service technician is able to view the internal components within the housing 6, their condition, position, and how they are interacting with each other. Such a transparent housing 6 has the benefit of allowing for the viewing of the internal components to see if they are in good condition and/or in the correct installed and operational positions, without needing to open the housing.

Referring to FIGS. 2-3, the belt insertion pocket 20 defined in the housing 6 is configured to permit a terminal or cut end of an elevator hoisting belt 2 to slidably be inserted therein, through an opening defined in the front side of the housing 6. A plurality of metal teeth 26 or barbs are disposed in thin retention slots 27 defined in one or more side walls of the belt insertion pocket 20 in the housing 6, with exposed ends of the teeth 26 protruding therefrom into the space defining the belt insertion pocket 20. The exposed ends of the teeth 26 protrude from the sidewalls of the belt insertion pocket 20 at an acute angle, directed generally inward in a direction of insertion of the hoisting member or belt 2 and generally toward a back end of the belt insertion pocket 20 of the housing 6. As will be discussed later in further detail, the teeth 26 may be configured such that, as the terminal or cut end of the belt 2 is slid into the belt insertion pocket 20, the outer jacket 28 of the belt 2 forces the teeth to deflect inward toward the walls of the belt insertion pocket 20 with which they make an acute angle, to permit the belt to be inserted to the proper termination depth, where the exposed cut ends 14 of the cords 4 of the belt 2 will make electrical contact with the elastomeric connector block 12 in the housing 6. The teeth are further configured to dig into the outer jacket 28 of the belt 2 to retain its insertion depth in the housing 6 and prevent the belt from backing out, being pushed out, or being pulled out of the belt insertion pocket 20 of the housing 6 in a direction opposite of the insertion direction.

In alternate embodiments, the teeth 26 may not deflect on the insertion of the belt 2 into the belt insertion pocket 20, rather the tips of the teeth 26 may be shaped or profiled so as to instead permit the surface of the outer jacket 28 to deform slightly as it slides past/over the tips of the teeth 26 as the belt 2 is pushed past the teeth 26. The number, positioning, angle, and length of protrusion of the tips of the teeth 26 into the space of the belt insertion pocket 20, may all be varied as needed to accommodate various sized elevator hoisting belts 2 having an outer jacket 28 made of varying materials without departing from the scope of the present disclosure. The primary purpose of the teeth 26 being to achieve at least a minimum predetermined amount of belt pull-out or push-out force, and/or to maintain an appropriate amount of belt engagement or retention in the belt insertion pocket 20 so as to continuously maintain electrical contact between the elastomeric connector block 12 and the exposed cut ends 14 of the belt cords 4.

Referring to FIGS. 3-6, further disposed within the housing is an elastomeric connector block 12 mechanically and electrically coupled to a printed circuit board (PCB) 16. The elastomeric connector block 12 is a flexible electrical connector that has alternating conductive layers 32 and non-conductive layers 33. In one embodiment, the elastomeric connector block 12 is made of a core 30, strip, or block of an elastomeric, non-electrically conductive material, around which core are wrapped a plurality of individual, embedded or affixed, thin electrical conductors that are spaced apart by layers of the non-conductive elastomeric core material. The thin conductors that form the conductive layers 32 are arranged parallel to each other and perpendicular to a longitudinal direction of the elastomeric core 30. The conductive layers 32 can be made of any suitable electrically conductive material commonly used to make electrical signal connections, such as for example, gold, silver, copper, carbon or other such material. In an alternate embodiment, rather than having a plurality of spaced apart conductors wrapped around an elastomeric core, the elastomeric connector block 12 may be a connector block that is laminate of full alternating layers of conductive material between which are disposed full layers of nonconductive elastomeric material, stacked to form the connector block 12. In either embodiment, the alternating conductive layers 32 and nonconductive layers 33 are sufficiently thin, such that several adjacent/successive conductive layers 32 may be electrically connected to a single trace 34 on the circuit board 16 at the same time. In this manner, the elastomeric connector block 12 provides electrical connection redundancy to each trace of the PCB 16, providing several electrical layers through which electrical connection may be made to each trace of the circuit board trace. Similarly, the alternating conductive layers 32 and non-conductive layers 33 are sufficiently thin such that, several adjacent/successive conductive layers 32 may be electrically connected to each of the exposed cut ends 14 of the cords 4, when a terminal end of the belt 2 is inserted into the connector 1 to cause the exposed cut ends 14 of the cords 4 to come into contact with the elastomeric connector block 12. In this manner, the elastomeric connector block 12 provides electrical connection redundancy to each of the exposed cut ends 14 of each cord 4 within the belt 2, providing several electrical layers through which electrical connection may be made to each cut end 14 of each cord 4.

Figure 5:
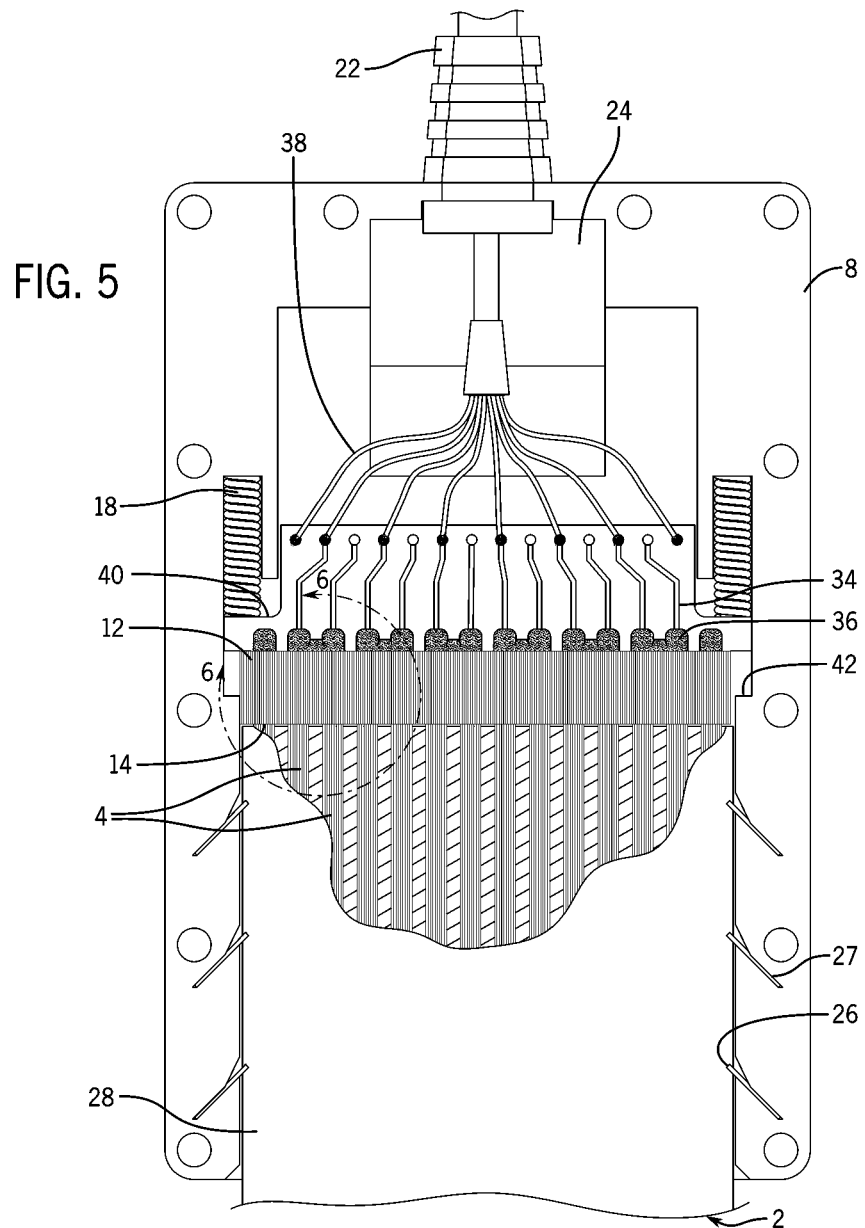
FIG. 5 is a top plan view of the monitoring connector of FIG. 4.

Referring to FIG. 5, in one embodiment, the PCB 16 includes a plurality of spaced apart solder pads (not shown) disposed on a top surface thereof near a front edge of the PCB 16, in which each individual solder pad is electrically connected to and defines an end of each of the traces 34 within the PCB 16. The elastomeric connector block 12 can be electrically and mechanically mounted to the PCB 16 by positioning the elastomeric connector block 12 in a desired position on or adjacent to the PCB 16, and soldering to each respective solder pad and its respective traces 34 only those individual conductive layers 32 in the connector block 12 that are aligned with each of the respective solder pads, so as to create a plurality of solder joints 36.

In one embodiment, the connector block 12 can be positioned to sit directly on a top surface of the PCB 16, or in alternate embodiments, the connector block 12 can be positioned in front of the PCB, such that a back face of the connector block 12 is abutting a front/leading edge of the PCB 16.

In one embodiment, the solder joints 36 between the connector block 12 and the solder pads of the PCB 16 can be made by positioning the elastomeric connector block 12 on either the top face of the PCB 16, or in front of the front edge of the PCB 16, with a back face of the connector block 12 disposed adjacent and perpendicular to the solder pads on the top surface of the PCB 16. The solder pads and the perpendicular back face of the conductor block 12 can be soldered together to create numerous solder edge joints 36 between each solder pad and the specific conductive layers 32 on the back face of the connector block 12 that are aligned with each solder pad 36.

In an alternate embodiment (not shown), the solder joints between the connector block 12 and the solder pads of the PCB 16 can be made by positioning the connector block 12 directly on a top surface of the PCB 16 over the solder pads, and reflow soldering the bottom face of the connector block 12 directly on top of the solder pads of the top face of the PCB 16. In this embodiment, the solder pads are covered by the bottom face of the connector block 12, and each solder pad is electrically connected to only those specific conductive layers 32 of the connector block 12 with which each solder pad is respectively aligned. However, in still further alternate embodiments (not shown), there may yet be additional alternative ways of mechanically and electrically coupling the elastomeric connector block 12 to the PCB 16, such as for example using a retaining bar or other such structure to securely clamp the entire length of the connector block 12 onto electrical pads of the PCB 16, thus eliminating the need for soldering the connector block 12 to the PCB 16, without departing from the scope of the present disclosure.

In some embodiments, the solder joints 36 connecting the PCB 16 to the connector block 12 can be made such that, for each conductive layer 32 in the connector block 12 that is soldered to a given solder pad, that conductive layer 32 is only soldered to a single solder pad, such as with the two opposing outermost solder joints 36 depicted in FIG. 5. However, referring still to FIG. 5, in yet additional alternate embodiments, two or more adjacently positioned PCB solder pads may be electrically bridged by a wide single solder joint 36, such that certain conductive layers 32 of the connector block 12 are actually soldered and electrically coupled to more than one solder pad as needed to accommodate a particular implemented electrical monitoring technique for the cords 4 in the belt 2.

With the PCB 16 coupled to the connector block 12 by solder joints 36 at one end of the traces 34 on the PCB 16, the proximal ends of a plurality of wires 38 from a monitoring signal cable 23 are soldered to opposing terminal ends of the PCB traces 34. The distal ends of the wires 38 of the signal cable 23 are configured to be electrically coupled to active belt health monitoring equipment 3. In this manner, when connected, the belt health monitoring equipment 3 is electrically coupled through each of the plurality of wires 38 of the signal cable 23, the PCB 16, and the elastomeric connector block 12. In one embodiment, the individual wires 38 are each soldered to one or more of the electrical traces 34 on the PCB 16. In various alternate embodiments, the individual wires 38 can be soldered to whichever traces are necessary for the particular active electrical monitoring techniques being implemented in the health monitoring equipment 3. In one embodiment, the monitoring signal cable 23 may enter the housing 6 through a strain relief boot 22 disposed in an outer wall of the housing 6, to relieve the cable 23 of bending stresses and tensions that could break the wires inside the housing 6 or the connection between the PCB 16 and the individual wires 38.

Figure 4:
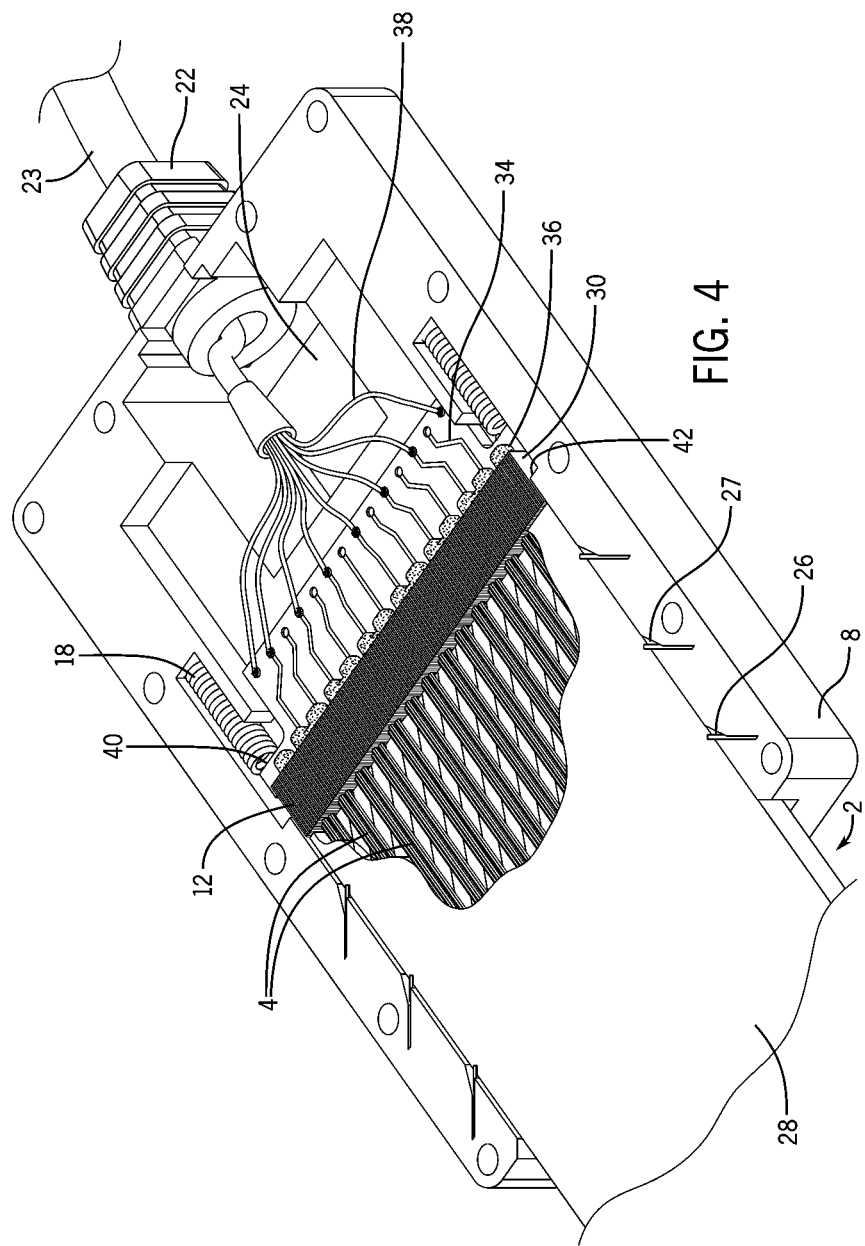
FIG. 4 is a perspective view of the monitoring connector of FIG. 1, with the housing cover removed for ease of visualization, showing the elevator hoisting member in the form of a belt, fully inserted to a final insertion depth at which the elastomeric connector block and PCB having been pushed deeper into the housing by the end of the belt, and against the biasing force of the springs acting on the PCB.

Referring to FIGS. 3-5, the PCB 16 and the mounted connector block 12 are disposed within the housing 6 within a recess sized to accommodate the PCB 16 and mounted connector block 12. The connector block 12 and PCB 16 are further positioned such that a front surface of the elastomeric connector block 12 facing the belt insertion pocket 20 defines, or forms, a back wall of the belt insertion pocket 20 in the housing 6. The recess in which the PCB 16 and the connector block 12 are housed is sized to permit the connector block 12 and the PCB 16 to which it is soldered to slidably move forward and backward along an axis defined by the direction of the belt 2 insertion, within the housing 6. In this manner, the front surface of the elastomeric connector block 12 that faces the belt insertion pocket 20, forms a movable back wall of the belt insertion pocket 20.

The slidably movable PCB 16 and affixed elastomeric connector block 12 are biased in a forward direction toward the belt insertion pocket 20 by at least one spring 18 disposed within the housing 6. In one embodiment, a pair of springs 18 are disposed within the housing 6 and contact a back edge of each of a pair of shoulders 40 on the PCB 16 that extend laterally outward from opposing side edges of the PCB 16. The springs 18 apply a forward directed biasing force to the back edge of the PCB 16, to force the PCB 16 and the connector block 12 forward toward the belt insertion pocket 20. However, in alternate embodiments, the housing 6 may contain therein an alternate number of springs 18, of various designs, arranged in alternate spring configurations, that are configured to provide a biasing force to any number of alternate features or structures of at least one of the PCB 16 and connector block 12, so as to bias both the PCB 16 and the elastomeric connector block 12 towards the belt insertion pocket 20, without departing from the scope of the present disclosure. In still alternate embodiments, rather than using one or more springs 18 to bias at least one of the PCB 16 and connector block 12 toward the belt insertion pocket, the springs may be replaced by one or more set screws (not shown) that can be turned to push or drive the PCB 16 and elastomeric connector block 12 toward the belt insertion pocket 20.

Referring to FIGS. 2 and 3, the housing 6 further includes one or more physical stops 42 disposed therein, against which at least one of the PCB 16 and elastomeric connector block 12 are forced into contact by the springs 18, when a hoisting belt 2 is not yet inserted into the belt insertion pocket 20. The physical stops 42 serve to prevent the connector block 12 and PCB 16 from moving any further forward into, or towards, the belt insertion pocket 12 beyond a predefined initial position within the housing 6, as the PCB 16 and connector block 12 are biased or forced in the forward direction towards the belt insertion pocket 20 by the springs 18.

In operation, the belt monitoring connector 1 works and is used as follows. Referring to FIGS. 2A and 2B, a portion of a terminal end of an elevator hoisting member, or hoisting belt 2, is shown in a front and top plan view respectively. The hoisting member, or hoisting belt 2, installed in an elevator system (not shown), has disposed therein a plurality of embedded cords 4 encapsulated in a polymer outer jacket 28. The terminal ends of the belt 2 are prepared by cutting them, or having them precut, such that the cut end face of the belt 2 is perpendicular to the longitudinal length of the belt 2. The perpendicularly cut end faces of the belt 2 expose the cut terminal ends 14 of the multiple tension members, or cords 4, embedded within the belt 2. This results in the exposed cut ends 14 of the cords 4 either being substantially flush with the cut face of the outer jacket 28 or, as is shown in FIG. 2B, more often times results in the cut ends 14 of the cords 4 protruding slightly from the outer jacket 28, as the cut end of the jacket 28 naturally pulls back slightly with respect to the cut ends 14 of the cords 4 after being cut.

Referring to FIG. 2, which shows a portion of the belt 2 sectioned away to make it easier to view the cords 4 embedded within the belt 2, the belt monitoring connector 1 is aligned with and slid onto the prepared terminal end of the belt 2 by slidingly inserting the terminal end of the belt 2 into the belt insertion pocket 20 of the housing 6 of the belt monitoring connector 1.

When the terminal end of the belt 2 is inserted into the connector 1, the housing 6 is fully assembled, with the housing cover 8 fastened to the housing base 10. However, FIGS. 4 and 5 show the belt 2 inserted into the belt monitoring connector 1 without the housing cover 8 installed, merely for ease of visualization of the internal interactions within the housing 6, and are not meant to imply that the belt 2 should be inserted without the housing cover 10 fastened in place to the housing base 8. Referring to FIGS. 4 and 5, when the belt is inserted into the belt insertion pocket 20, the outer jacket 28 of the belt 2 pushes past/over the exposed ends of the plurality of teeth 26 disposed in the sidewalls of the belt insertion pocket 20, causing the teeth 26 to deflect. Once the belt is pushed all the way into its final insertion depth, the teeth 26 are configured to dig into the outer jacket 28 to hold the belt 2 in place with respect to the housing 6, and prevent the belt 2 from being slidingly pushed or pulled back out of its position within the belt insertion pocket 20 of the housing 6.

Figure 6:
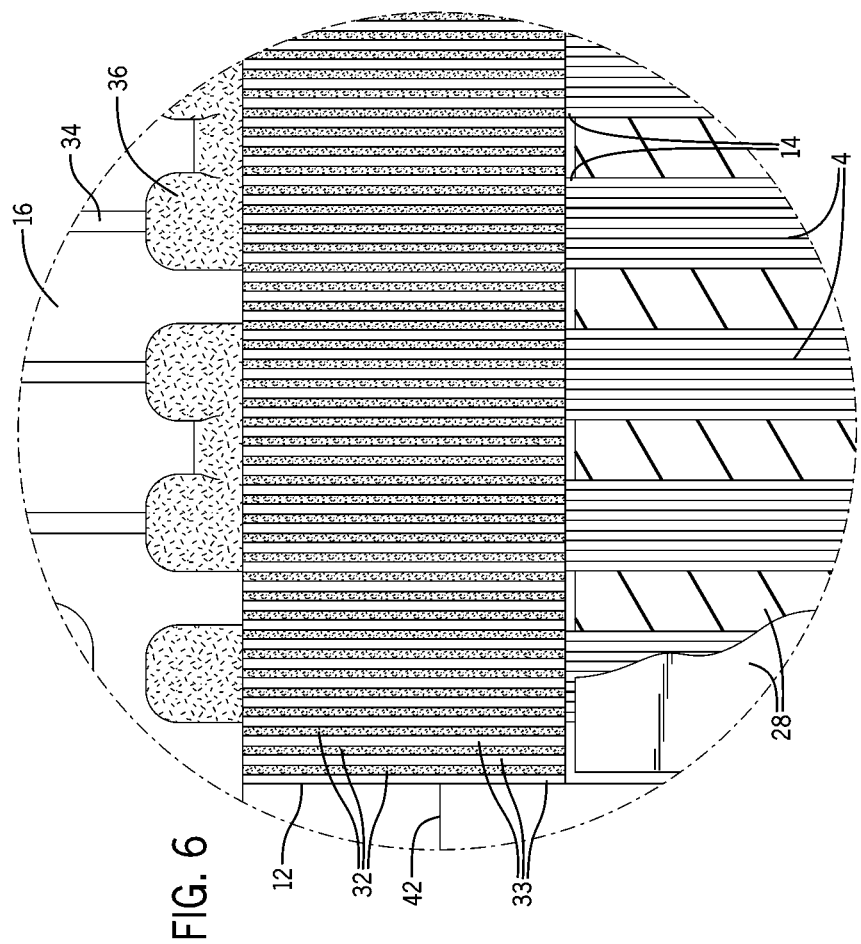
FIG. 6 is a detail view of FIG. 5, showing the interface within the monitoring connector between the exposed cut ends of the tension members, in the form of cords, within the belt and the conductive layers of the elastomeric connector block, and also showing the solder joint between the conductive layers of the elastomeric connector block and one or more of the PCB traces and solder pads.

Referring to FIGS. 4-6, the belt 2 is pushed into the belt insertion pocket 20 a sufficient distance until each exposed cut end 14 of each of the cords 4 in the belt 2 makes physical and electrical contact with the specific multiple conductive layers 32 of the elastomeric connector block 12 with which each cord 4 is aligned in the housing 6. The belt 2 is then pushed further into the belt insertion pocket 20 and reaches a final insertion depth when the terminal end of the belt 2 drives the elastomeric connector block 12 and PCB 16 backwards within the housing 6, off of the physical stops 42 against which they were originally resting, in a direction opposite the direction of the biasing force of the springs 18 acting on both the PCB 16 and elastomeric connector block 12. Using the terminal end of the belt 2 to drive the elastomeric connector block 12 and PCB 16 backwards off of the physical stops 42 in turn removes the force of the springs (acting through the intermediary PCB 16 and connector block 12) from acting on the physical stops 42 and transfers that force to now acting on the exposed cut ends 14 of the cords 4 in the terminal end of the belt 2. It also further compresses the springs 18 within the housing 6, thereby increasing the biasing force that is now pressing the elastomeric connector block 12 and PCB 16 against the exposed cut ends 14 of the cords 4 within the belt 2. At the same time, the presence of the teeth 27 digging into the belt outer jacket 28 holds the belt 2 in place within the housing 6 and prevents the increased biasing force of the compressed springs 18 from pushing the belt 2 back out of the insertion pocket 20 from its final insertion depth, and ensures that the further compressed springs 18 will continuously force the PCB 16 and elastomeric connector block 12 against the exposed cut ends 14 of the cords 4 to maintain a secure physical and electrical connection therebetween.

In an alternate embodiment, the housing 6 does not utilize one or more springs 18 to bias the PCB 16 and elastomeric connector block 12 against the exposed cut ends 14 of the cords 4 within the belt 2. Rather, one or more set screws (not shown) can be used for this purpose. In such an embodiment, the set screws would be configured such that the tip of the set screw(s) would contact the back edge of the PCB 16, or an additional support bar or strap running across the back of the elastomeric connector block 12. The set screw(s) could be withdrawn a distance out of the housing 6 to permit the terminal end of the belt 2 that is inserted into the belt insertion pocket 20 to drive or push the elastomeric connector block 12 and PCB 16 backwards within the housing 6. The set screw(s) can then be screwed back into the housing 6 so that the tip of the set screws pushes on one or more of the back edge of the PCB 16, or the support bar or strap on the back of the elastomeric connector block 12, so as to push the front face of the elastomeric connector block against the exposed cut ends 14 of the cords 4 within the belt 2. The set screws would apply a forward force that is transferred to the elastomeric connector block 12 sufficient to ensure the presence of a secure electrical connection between the conductive layers 32 in the elastomeric connector block 12 and exposed cut ends 14 of the cords 4 within the belt 2.

Referring again to FIGS. 1-3, in one embodiment, the housing cover 10 is made of a transparent material, which makes it possible to easily view the inner components of the connector 1 and the belt 2 being inserted therein, and to visually determine when the belt 2 has been inserted far enough into the belt insertion pocket 20 of the housing 6 to force the elastomeric connector block 12 and the PCB 16 back away from the physical stops 42 and compress the springs 18. If the belt 2 has not been inserted far enough into the belt insertion pocket 20 of the housing 6 to achieve this result, the belt is pushed further into the housing 6, while simultaneously viewing the belt 2, connector block 12, PCB 16, and physical stops 42, until such result is achieved. The transparent housing cover 10 also makes it possible to visually confirm that, once the belt is no longer being forced or slid into the belt insertion pocket 20, the PCB 16 and elastomeric connector block 12 remain driven to a position off of the physical stops 42 within the housing 6, and that the teeth 26 have dug in to the belt outer jacket 28 to prevent the belt 2 from being forced back out of the belt insertion pocket 20, from its final insertion depth, by the compressed springs 18. Accordingly, the transparent housing cover 10 serves to facilitate an easy visual inspection function to ensure physical and electrical contact between the cut ends 14 of the cords 4 and the elastomeric connector block 12, and to ensure none of the solder joints 36 between the connector block 12 and the PCB 16 have cracked or failed. If any such connectivity failures are visually found to exist upon later inspection of the belt monitoring connector 1, if needed, the belt 2 can be further inserted into the housing 6 to an acceptable insertion depth to ensure proper physical and electrical contact. Alternatively, the housing cover 10 can be removed to facilitate either repairs to the solder joints 36, or removal of the belt 2 from the housing 6. If the belt 2 is removed from the housing 6, the housing cover 10 can again be secured to the base 8 and the belt 2 can either be reinserted, or the end of the belt 2 can be recut and reinserted into the belt insertion pocket 20 to a proper insertion depth.

Figure 7:
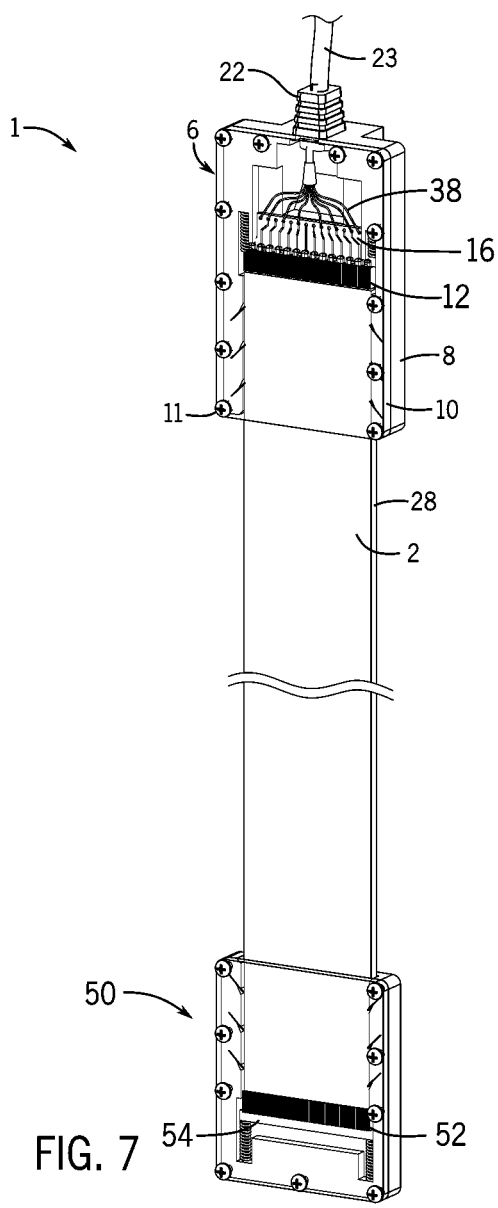
FIG. 7 is a perspective view showing an embodiment of an active belt monitoring connector of the present disclosure installed on a first terminal end of an elevator hoisting member in the form of a belt, and an embodiment of a passive belt monitoring connector of the present disclosure installed on an opposing second terminal end of the elevator hoisting member.

Referring to FIG. 7, in one embodiment, the opposing terminal ends of the elevator hoisting member, in the form of a belt 2, each have a belt monitoring connector 1, 50 respectively installed thereon. Electrical health monitoring signals are sent by the health monitoring equipment at one end of the belt down one or more of the tension members, or cords, within the belt, and are then redirected back up different of the cords within the belt, back to the health monitoring equipment, where the returned signal is analyzed by the health monitoring equipment for any changes in the health of the one or more cords through which the signal traveled. To do so, the opposing terminal ends of the belt 2 are each inserted into respective housings 6 of belt monitoring connectors 1, 50, to a proper termination depth at which the exposed cut ends of the embedded tension members, or cords 4, within the belt 2 are each brought into secure electrical contact with several of the electrically conductive layers of their respective elastomeric connector blocks 12, 52. In this embodiment, a first terminal end of the belt 2 has an active first electrical monitoring connector 1 installed thereon, that includes a monitoring signal cable 23 having a plurality of wires 38 connected at their proximal ends to the circuit board, and a plurality of distal ends (not shown) configured to be connected to the belt health monitoring equipment (not shown). The belt monitoring equipment is configured to send electrical monitoring signals down one or more of the wires 38, through the circuit board 16 and the conductive layers of the elastomeric connector block 12, and down one or more of the tension members, or cords embedded within the belt 2. The electrical signals travel down the cords 4 to the opposing second terminal end of the belt 2.

On the opposing second terminal end of the belt 2, a second passive monitoring connector 50 is installed. This monitoring connector 50 is considered passive because it does not include a monitoring signal cable 23 connected to any active monitoring equipment. Rather, the PCB 54 within the second passive monitoring connector 50 includes traces 34 that merely serve to electrically connect together two or more of the cut ends 14 of two or more cords 4 of the belt. In an alternate embodiment, the PCB may not include any actual traces within the PCB and instead may simply serve only to support the use of large solder joints to connect the PCB 54 to the elastomeric connector block 52, with the solder joints being wide enough across the back of the elastomeric connector block to electrically bridge, couple, or connect adjacent exposed cut ends 14 of two or more cords 4 to each other. In either embodiment of the configuration of the PCB 54 within the passive monitoring connector 50, an electrical monitoring signal can be sent from the health monitoring equipment down a first cord at a first end of the belt 2, reach the opposing end of the first cord at the opposing second end of the belt 2, be redirected back up a second cord from the second end of the belt 2 back to the opposing first end of the belt 2 from where the signal was originally sent, and where the signal is also received and analyzed/evaluated by the health monitoring equipment 3.

In alternate embodiments, the paths of electrical connection/conduction of one or more of the electrical traces on the PCB's 16, 54, and/or the solder joints 36 between the PCB 16, 54 and the elastomeric connector blocks 12, 52 can be altered in any number of ways to configure the electrical path of the monitoring signal to travel down and/or back up any number cords 4 and in any order, to create any electrical circuit needed to accommodate the specific electrical monitoring scheme that is being implemented. In this manner, the belt monitoring connectors 1, 50 disclosed herein can be configured to permit electrical monitoring signals to be sent down or along any combination of cords 4 within the belt 2, and received back from any of the cords 4 within the belt 2, at any combination of either end of the belt 2 and cords 4, without departing form the scope of the present disclosure.

In one embodiment, the electrical monitoring technique being implemented may be resistance monitoring. With such a technique, the health monitoring equipment 3 is configured to work with the belt monitoring connector 1 to monitor the health of the tension members or cords 4 within the belt 2 by actively sending a DC signal, or an AC signal, down one or more cords 4 and measuring the resulting electrical resistance for each of the cords 4 in the belt 2. If there is a measured change in the electrical resistance of each electrical circuit made by one or more of the monitored cords 4, this would indicate a potentially negative change in the health of the cords 4 and therefore the belt 2; for example, the presence of broken strands or wires in a cord 4, or the present of corrosion on one or more of the cords 4. Each cord 4 can form its own monitored circuit such that it is measured individually, or in alternate embodiments, two or more cords 4 can be electrically connected together in series, parallel, or other configurations as needed, to be monitored together. In additional alternate embodiments, still additional electrical monitoring techniques can be implemented without departing from the scope of the present disclosure, such as impedance monitoring, and capacitance monitoring.

What is claimed is:

1. An electrical monitoring connector for use with an elevator hoisting member, for electrically monitoring the health of the elevator hoisting member, the monitoring connector comprising:
   a housing defining a hoisting member insertion pocket, said insertion pocket being configured to permit insertion therein of a terminal end of an elevator hoisting member, at which terminal end are located exposed cut ends of a plurality of electrically conductive tension members embedded in an outer jacket;
   a circuit board disposed in said housing and slidably movable therein along an axis of insertion defined by the insertion direction of the elevator hoisting member;
   a plurality of wires having proximal ends disposed within said housing and electrically connected to said circuit board, and having distal ends configured to be electrically connected to electrical health monitoring equipment;
   an elastomeric connector block disposed in said housing and having a plurality of alternating electrically conductive layers and electrically non-conductive layers, and being physically affixed and electrically coupled to said circuit board so as to be slidable in said housing with said circuit board; and
   at least one spring disposed within said housing and configured to bias said elastomeric connector block in a direction toward said hoisting member insertion pocket and against the exposed cut ends of the plurality of electrically conductive tension members when the terminal end of the elevator hoisting member is inserted in said housing to a termination depth, so as to make electrical connections between the exposed cut ends of the tension members and only those of said plurality of electrically conductive layers that are aligned and make contact therewith, so as to permit the sending and receiving of monitoring signals from the health monitoring equipment, through the plurality of wires, the circuit board, the elastomeric connector block, and the plurality of tension members.

2. The electrical monitoring connector of claim 1, wherein said housing comprises a housing base, and a housing cover secured to said housing base.

3. The electrical monitoring connector of claim 2, wherein at least one of said housing base or housing cover are transparent.

4. The electrical monitoring connector of claim 1, further comprising a plurality of teeth disposed in an inner wall of said housing and protruding inward into said hoisting member insertion pocket.

5. The electrical monitoring connector of claim 1, further comprising a strain relief boot disposed in a wall of said housing through which said wires enter said housing.

6. An electrical monitoring connector for use with an elevator hoisting member, for electrically monitoring the health of the elevator hoisting member, the monitoring connector comprising:
   a housing configured to permit insertion therein of a terminal end of an elevator hoisting member, at which terminal end are located exposed cut ends of a plurality of electrically conductive tension members embedded in an outer jacket;
   a circuit board disposed in said housing and slidably movable therein along an axis of insertion defined by the insertion direction of the elevator hoisting member, said circuit board configured to be electrically connected to electrical health monitoring equipment;
   an elastomeric connector block disposed in said housing and having a plurality of alternating electrically conductive layers and electrically non-conductive layers, and being physically affixed and electrically coupled to said circuit board, so as to be slidable in said housing with said circuit board; and
   at least one spring disposed within said housing and configured to bias said elastomeric connector block against the exposed cut ends of the plurality of electrically conductive tension members when the terminal end of the elevator hoisting member is inserted in said housing to a termination depth, so as to make electrical connections between the exposed cut ends of the tension members and only those of said plurality of electrically conductive layers that are aligned and make contact therewith, so as to permit the sending and receiving of monitoring signals from the health monitoring equipment, through the circuit board, the elastomeric connector block, and the plurality of tension members.

7. The electrical monitoring connector of claim 6, further comprising a plurality of wires with proximal ends disposed within said housing and electrically connected to said circuit board, and distal ends configured to be electrically connected to the electrical health monitoring equipment.

8. The electrical monitoring connector of claim 6, wherein said housing comprises a housing base, and a housing cover secured to said housing base.

9. The electrical monitoring connector of claim 8, wherein at least one of said housing base or housing cover are transparent.

10. The electrical monitoring connector of claim 6, further comprising:
    a plurality of wires having proximal ends disposed within said housing and electrically connected to said circuit board, and having distal ends configured to be electrically connected to electrical health monitoring equipment.

11. The electrical monitoring connector of claim 6, further comprising:
    a plurality of teeth, disposed in, and protruding from, an inner wall of said housing, that are configured to engage the outer jacket of the elevator hoisting member when the elevator hoisting member is inserted into said housing, so as to prevent the hoisting member from being withdrawn therefrom.

12. An electrical monitoring connector for use with an elevator hoisting member, for electrically monitoring the health of the elevator hoisting member, the monitoring connector comprising:
    a housing configured to permit insertion therein of a terminal end of an elevator hoisting member, at which terminal end are located exposed cut ends of a plurality of electrically conductive tension members embedded in an outer jacket;
    an elastomeric connector block disposed in said housing and having a plurality of alternating electrically conductive and electrically non-conductive layers, and being slidably movable within said housing along an axis of insertion defined by the insertion direction of the elevator hoisting member, said connector block configured to be electrically connected to electrical health monitoring equipment; and
    at least one biasing means disposed within said housing and configured to bias said elastomeric connector block against the exposed cut ends of the plurality of electrically conductive tension members, when the terminal end of the elevator hoisting member is inserted in said housing to a termination depth, so as to make electrical connections between the exposed cut ends of the tension members and only those of said plurality of electrically conductive layers that are aligned and make contact therewith, so as to permit the sending and receiving of monitoring signals from the health monitoring equipment through the plurality of tension members.

13. The electrical monitoring connector of claim 12, further comprising a circuit board physically connected to said elastomeric connector block, so as to be slidably movable therewith, and electrically connected between said elastomeric connector block and the electrical health monitoring equipment.

14. The electrical monitoring connector of claim 13, further comprising a plurality of wires with proximal ends disposed within said housing and electrically connected to said circuit board, and distal ends configured to be electrically connected to the electrical health monitoring equipment.

15. The electrical monitoring connector of claim 12, wherein said housing comprises a housing base, and a housing cover secured to said housing base.

16. The electrical monitoring connector of claim 15, wherein at least one of said housing base or housing cover are transparent.

17. The electrical monitoring connector of claim 12, further comprising a plurality of teeth, disposed in, and protruding from, an inner wall of said housing, that are configured to engage the outer jacket of the elevator hoisting member, when the elevator hoisting member is inserted into said housing, so as to prevent the hoisting member from being withdrawn therefrom.

* * * * *